US007938428B1

(12) United States Patent    (10) Patent No.:    US 7,938,428 B1
Mann et al.    (45) Date of Patent:    May 10, 2011

(54) BRACKET ASSEMBLY FOR A FIFTH WHEEL COUPLING

(75) Inventors: Steven William Mann, Gardendale, AL (US); Gavin Charles Trinoskey, Birmingham, AL (US)

(73) Assignee: Fontaine Fifth Wheel Co., Trussville, AL (US)

( * ) Notice: Subject to any disclaimer, the term of this patent is extended or adjusted under 35 U.S.C. 154(b) by 183 days.

(21) Appl. No.: 12/466,245

(22) Filed: May 14, 2009

(51) Int. Cl.
    *B62D 53/08* (2006.01)
(52) U.S. Cl. .................. 280/438.1; 280/441.1
(58) Field of Classification Search ..... 280/438.1–441.1
    See application file for complete search history.

(56) References Cited

U.S. PATENT DOCUMENTS

| 4,614,355 | A  | * | 9/1986 | Koch .................... | 280/438.1 |
| 6,592,140 | B1 | * | 7/2003 | Alguera Gallego et al. .. | 280/441 |
| 6,736,420 | B2 | * | 5/2004 | Laarman et al. ........... | 280/438.1 |
| 7,584,982 | B2 | * | 9/2009 | Fisher ................... | 280/438.1 |
| 2004/0173992 | A1 | * | 9/2004 | Stunder et al. ........... | 280/438.1 |
| 2006/0202443 | A1 | * | 9/2006 | Sibley et al. ............. | 280/441 |

* cited by examiner

*Primary Examiner* — Kevin Hurley
(74) *Attorney, Agent, or Firm* — George P. Kobler; Lanier Ford Shaver & Payne, PC

(57) ABSTRACT

A bracket assembly for an adjustable fifth wheel hitch is suitable for mounting to a slide rail assembly, which itself is mounted to parallel longitudinal truck frame members, where the slide rails have a generally t-shaped cross-section. The slide rail is comprised of a horizontal portion and a vertical portion, the vertical portion including a plurality of spaced-apart gaps. The bracket assembly comprises a bracket body with longitudinal disposed front and rear ends, with respect to the truck body, a longitudinal channel defined in the underside that extends from front and rear openings defined in the respective surfaces of the front and rear ends with a generally t-shaped cross-section to slidably receive said slide rail. The bracket body also has two spaced-apart transverse channels defined in the underside, perpendicular to the longitudinal channel. The transverse channels align with two of the space-apart gaps as the bracket body is slid along the slide rail. The bracket body also includes a rounded upper portion for providing pivoting support to a fifth wheel hitch plate, and forward and rear tie-bar flanges extending from one side of the lower portion of the body for mounting support for a tie bar to mutually tie brackets together.

19 Claims, 9 Drawing Sheets

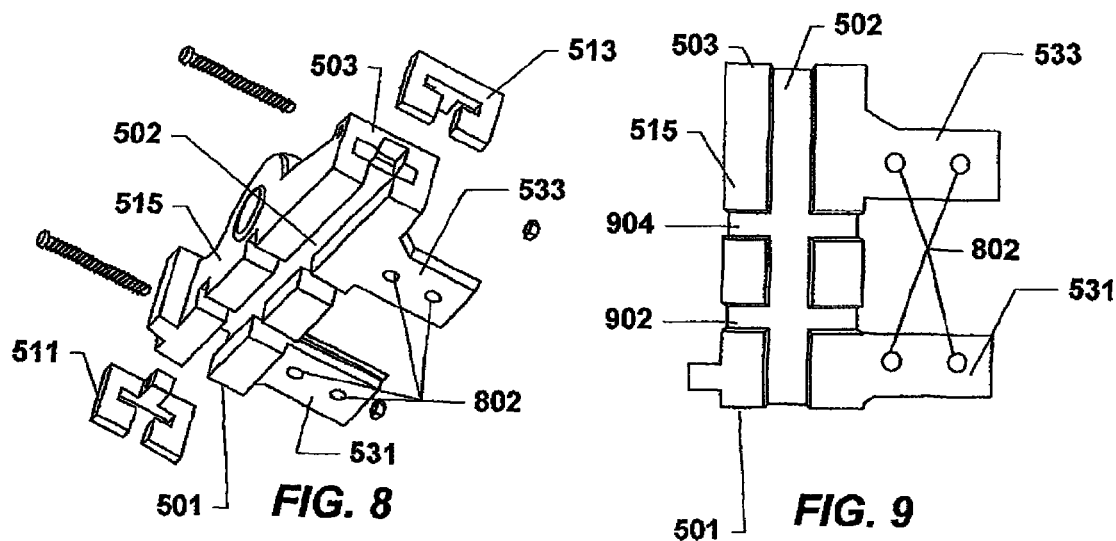
FIG. 8
FIG. 9
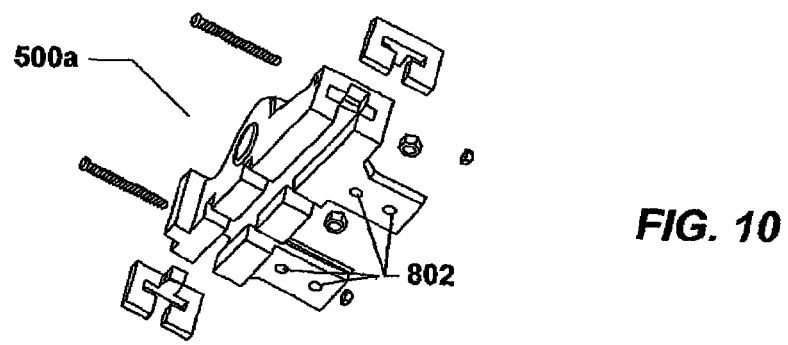
FIG. 10
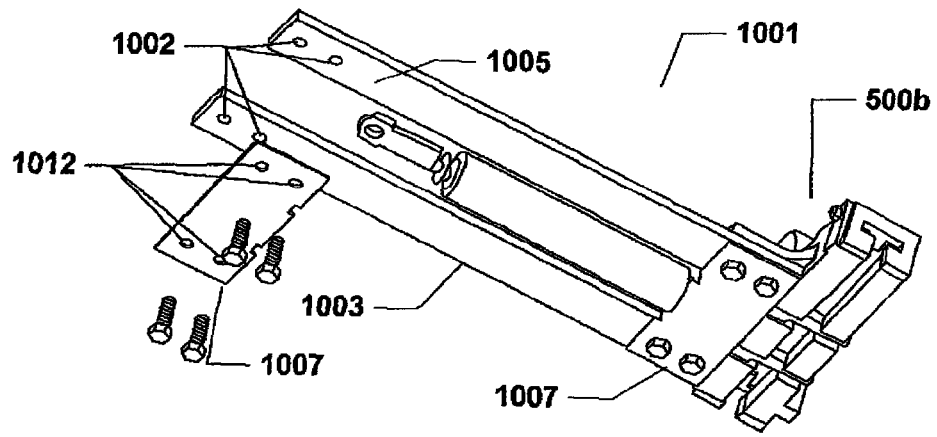

_US 7,938,428 B1_

BRACKET ASSEMBLY FOR A FIFTH WHEEL COUPLING

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 8 is a perspective view of the underside of the bracket assembly of FIG. 5 from the rearward lateral quarter;

FIG. 9 is an underside plan view of an exemplary bracket body;

FIG. 10 is a perspective view of an exemplary slide assembly 1001;

DETAILED DESCRIPTION

The various embodiments of the present invention and their advantages are best understood by referring to FIGS. 1 through 12 of the drawings. The elements of the drawings are not necessarily to scale, emphasis instead being placed upon clearly illustrating the principles of the invention. Throughout the drawings, like numerals are used for like and corresponding parts of the various drawings.

The drawings represent and illustrate examples of the various embodiments of the invention, and not a limitation thereof. It will be apparent to those skilled in the art that various modifications and variations can be made in the present inventions without departing from the scope and spirit of the invention as described herein. For instance, features illustrated or described as part of one embodiment can be included in another embodiment to yield a still further embodiment. Moreover, variations in selection of materials and/or characteristics may be practiced to satisfy particular desired user criteria. Thus, it is intended that the present invention covers such modifications as come within the scope of the features and their equivalents.

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

Terms such as "aft," "rear," "forward," "front," "lateral," "inboard" "longitudinal," "transverse," or "outboard," or the like, and variations or derivatives thereof, are to be understand in relation to the vehicle on which the fifth wheel is mounted. However, it is to be understood that the invention may assume various alternative orientations, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
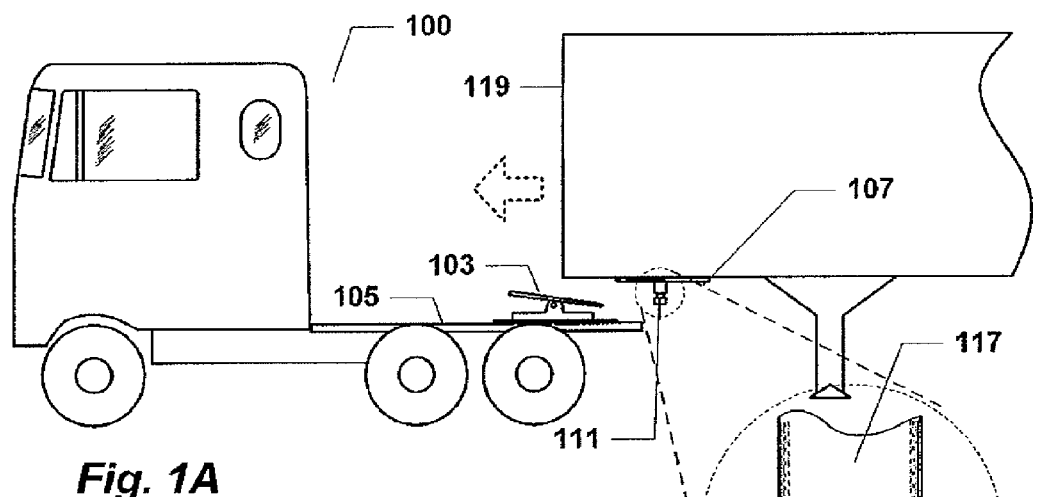
FIG. 1A is an exemplary tractor truck and trailer with a fifth wheel hitch.
Figure 1B:
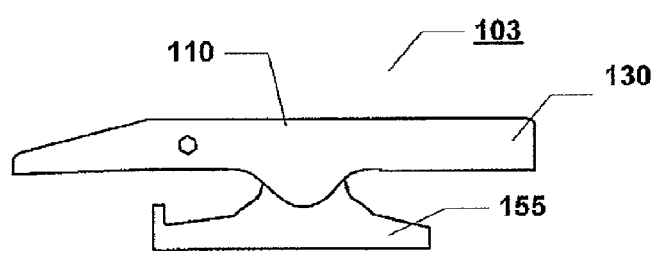
FIG. 1B is an exemplary fifth wheel hitch.
Figure 1C:
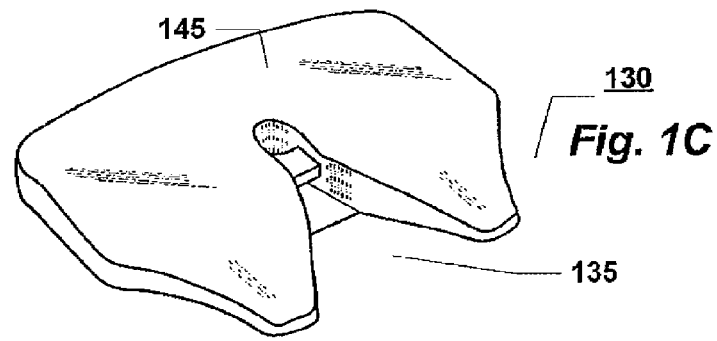
FIG. 1C is an exemplary hitch plate.

Referring to the Figures, fifth wheel hitches are well known in the field of towing trailers using a truck or tractor. FIGS. 1A through 1C depict an exemplary tractor and trailer hitch arrangement employing a fifth wheel hitch. Tractor 100 is affixed with a fifth wheel hitch 103 to rear of tractor frame 105. Fifth wheel hitch 103 includes a fifth wheel hitch assembly 110 pivotally mounted on pedestal 155. Fifth wheel hitch assembly 110 comprises hitch plate 130 which houses a locking mechanism underneath (shown and described in greater detail below) with slot 135 opening toward the aft end of fifth wheel assembly 110 for receiving a kingpin 111 from trailer 119.

Kingpin 111 typically extends downward from a trailer bearing plate 107, which rests upon fifth wheel assembly, specifically, upon load area 145 of fifth wheel hitch plate 130. Kingpin is, typically, a unitarily constructed article comprised of a lower flange 115 capping a shank 113 which extends from collar 117.

Figure 1D:
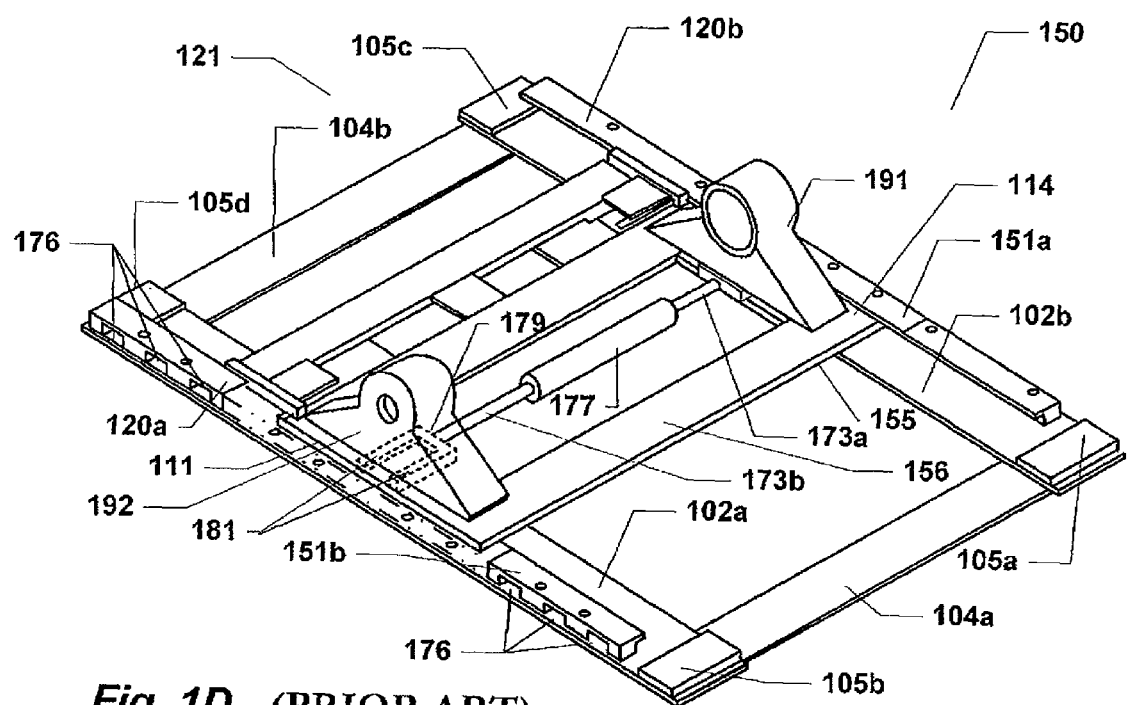
FIG. 1D is an exemplary prior art fifth wheel slide rail assembly.

FIG. 1D depicts an example of the prior art slide rail where slide rail assembly 120a is comprised of left and right slide rail plates 102a, b tied in parallel by two or more tie bars 104a, b which form slide frame 121. Left slide rail 102a is attached to the upper surface of left slide rail plate 102a and right slide rail 151a is attached to upper surface of right slide rail plate 102b such that fifth wheel hitch assembly 110 and pedestal 155 are located therebetween, inboard of the left and right slide rails 102a, b. Slide rail plates 102a, b and slide rails 151a, b each have longitudinal axes which parallel the longitudinal axis of tractor 109. Slide stop blocks 105a-d are located at each end of each slide rail plate 102a, b. Slide stop blocks 105a-d prevent over travel of pedestal 155. As is shown in the illustration, slide rails 151a, b of the prior art are typically a flange extending inboard of the assembly, slidably receiving flanges 111, 114 of pedestal 155. Slide rails 151a, b typically include gaps, or detents, 176 spaced along the length of the slide rail.

The pedestal 155 typically comprises a sliding plate 156 which supports the mounting brackets 191, 192 and means for selectively locking the pedestal 155 in position longitudinally with respect to the slide rail assembly. One example of such means, shown in FIG. 1D, is a pneumatic cylinder 177 mounted in the pedestal from which laterally extend plunger arms 173*a, b*. A fork member 179 may be mounted to the respective lateral ends of plunger arms 173, where the fork member includes projections, or prongs, 181 that insert into the slide rail gaps 176 when the plungers arms are extended. The engagement of the projections 181 into the gaps 176, thus, prevents longitudinal movement of the pedestal, and, therefore, the fifth wheel assembly.

Mounting brackets 191, 192 provide pivoting support to the hitch plate 130. Hitch plate 130 is pivotally connected to mounting brackets 191, 192 through a mounting pin (not shown) inserted through corresponding mounting pin holes in the hitch plate and the mounting brackets.

Figure 2:
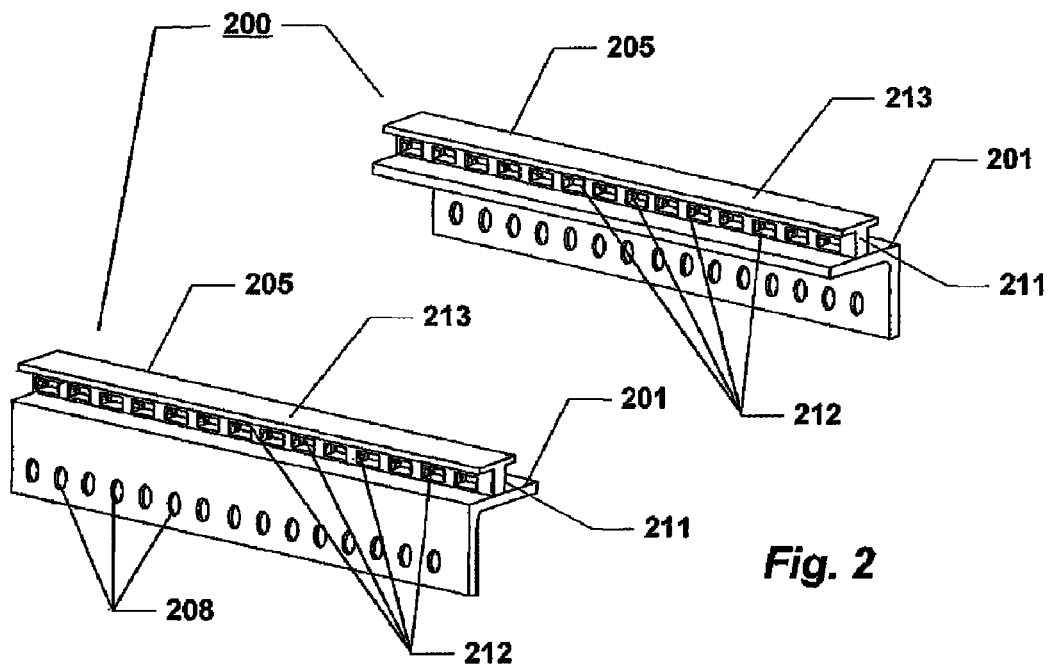
FIG. 2 depicts an exemplary slide rail according to an aspect of the present invention.
Figure 3:
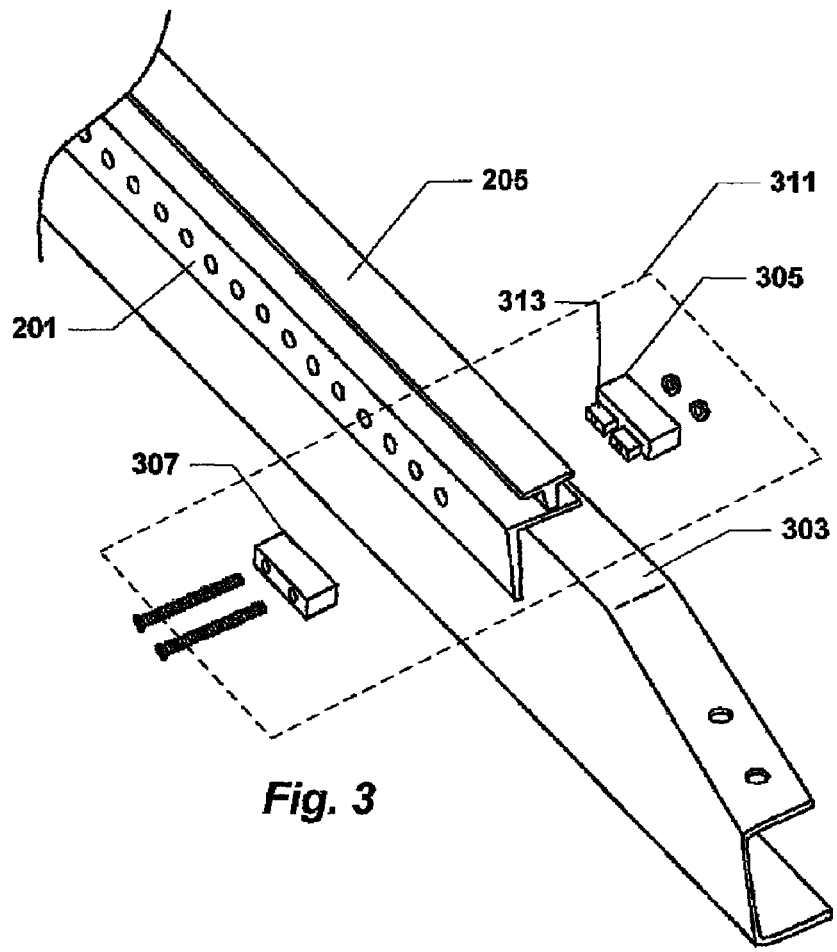
FIG. 3 depicts an exemplary slide rail assembly mounted to a truck frame member.
Figure 4:
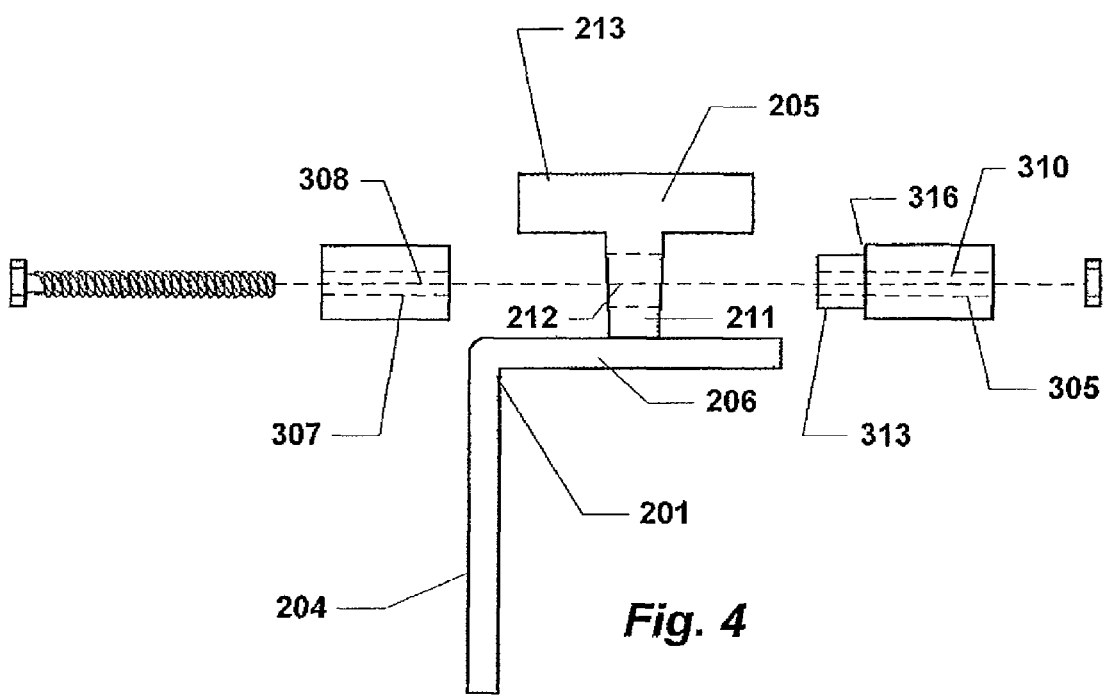
FIG. 4 is an illustrative end-on view of an exemplary slide rail assembly.

In FIGS. 2 through 4, a slide rail assembly 200, includes an angle member 201 having a vertical portion 204 and a horizontal portion 206. Preferably, a plurality of apertures 208 are disposed in the vertical portion 204 thereof. A slide rail 205 having a "t-shaped" cross-section is affixed to the top surface of the horizontal portion 206 of the angle member 201 by, for example, welding or fasteners, or both. Slide rail 205 is defined by generally vertical base section 211 and a crossing top section 213. The vertical base section 211 is set upon the horizontal portion of the angle member 201 and includes a series of gaps 212. Gaps 212 are to receive prongs (not shown) that selectively extend laterally from a sliding pedestal which supports the fifth wheel hitch.

As shown in FIG. 3, angle member 201 is mounted to a truck frame member 303 by inserting fasteners, for example, bolts with nuts, into one or more of the plurality of apertures 208 in the vertical portion of angle member and through corresponding apertures bored within the truck frame member 303. The assembly 200 typically includes two opposing slide rails 205 mounted in parallel (FIG. 2) on consecutive, parallel truck frame members.

Slide rail assembly 200 may also include a stop block assembly 311 secured to each end. As depicted in FIGS. 3 and 4, stop block assembly 311 includes an inboard block 305 and an outboard block 307, removably fastened together with a threaded fastener with the slide rail 205 vertical portion interposed between them. Both blocks 305, 307 include two or more bores 308, 310 for receiving bolts. The bores 308 within the outboard block 307 correspond to the bores 310 within the inboard block 305 and are also spaced to correspond to adjacent gaps 212 with the slide rail vertical portion. As depicted, block 305, 307 preferably is configured with a rectangular boss 313 surrounding each bore 308, 310 and extending from the interior surface of the block 305, 307 resulting in a shoulder area 316 surrounding the boss 313. The rectangular bosses 313 are dimensioned to fit snugly within adjacent gaps 212 in the slide rail 205 permitting shoulder area 316 to be seated against vertical base section 211 when a fastener is inserted in the bores 308, 310, and draws the blocks 305, 307 toward each other. It will be appreciated that either block may be configured with a boss 313. Alternatively, each block 305, 307 may have a boss 313 located so that it is received in the gap 212 adjacent the boss 313 extending from the opposing block.

Figure 5:
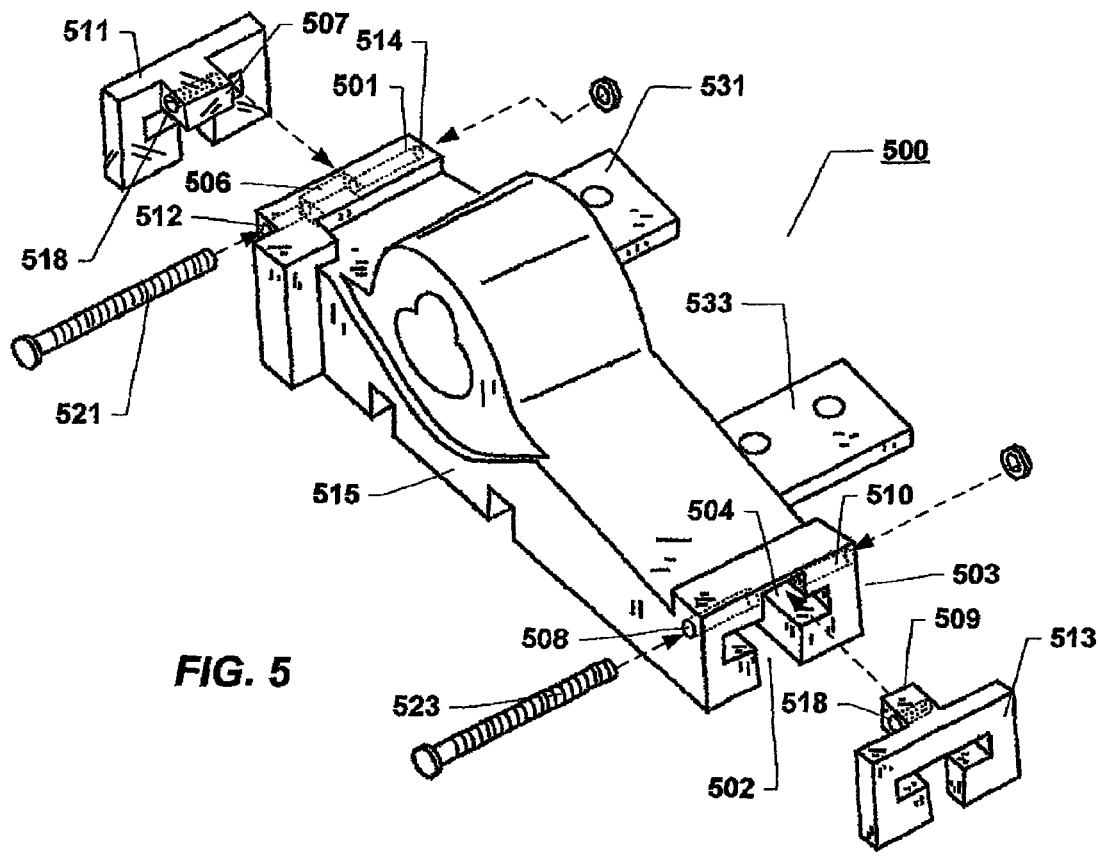
FIG. 5 depicts a perspective rear quarter view of an exemplary bracket assembly intended for use with the slide rail assembly of FIGS. 2 through 4.

An exemplary mounting bracket assembly 500 for use with such a slide rail apparatus is shown in FIGS. 5-9. FIG. 5 is a perspective view from the outside rear quarter of the assembly 500 having a mounting bracket body 515 which includes forward and rear ends 501, 503, and defines a channel 502 that extends from the surface of the front end 501 along the longitudinal axis of the body 515 to the surface of the rear end 503. The channel 502, also shown in plan view in FIG. 8, in this embodiment, substantially "t-shaped" cross-section, with respect to the longitudinal axis of the bracket, to accommodate the slide rail 205. A recess 504, 506 is defined in each end 501, 503 above the channel 502 with a depth extending toward the interior of the bracket 500. A first transverse bore 508 is defined in the outboard wall of the bracket end 503 through to the outer lateral wall of the recess 504, and a second transverse bore 510 is defined on the same axis as the first bore 508 in the inboard wall of the bracket end 503 through to the inner lateral wall of the recess 504. The identical configuration is found on the opposing end 501 of the bracket 500 where a third transverse bore 512 is defined in the outboard wall of forward bracket end 501 to the outboard lateral wall of forward recess 506. Finally, a fourth transverse bore 514 is defined co-axially with the third bore in inboard wall of the forward bracket end 501 to the inboard lateral wall of forward recess 506.

Figures 6A, 6B, 7:
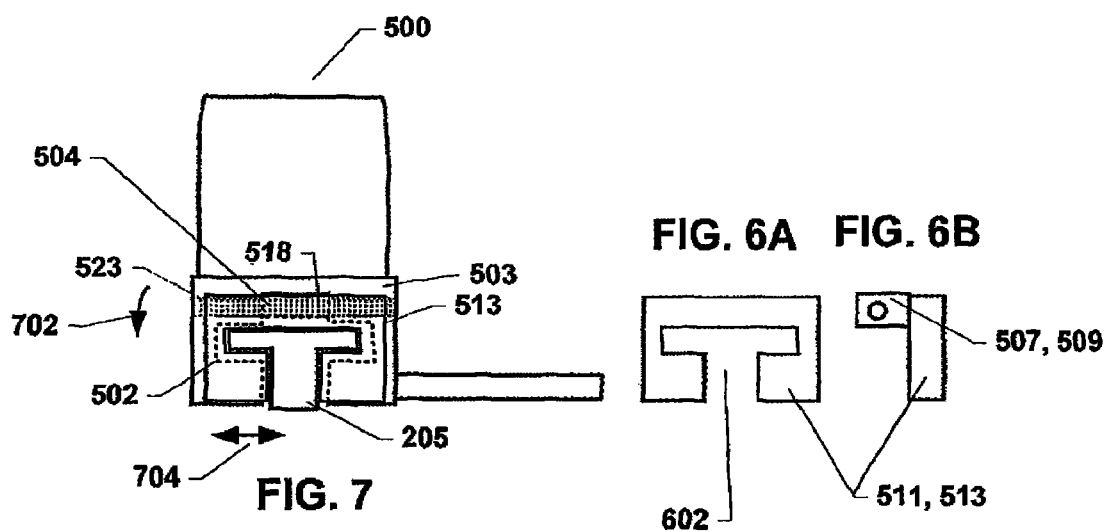
FIGS. 6A & 6B are two views of an insert for use with the bracket assembly of FIG. 5.
FIG. 7 is a rearward end-on view of the bracket assembly of FIG. 5 mounted on a slide rail.

The assembly 500 includes front and rear inserts 511, 513, each inserts 511, 513, also shown in FIGS. 6A, 6B, having a longitudinally extending mounting tab 507, 509. Front and rear inserts 511, 513 are each "c-shaped" defining a "t-shaped" cut-out 602, the perimeter of which is dimensioned to be slightly smaller than the perimeter of the "t-shaped" channel 502. Front recess 506 is dimensioned to receive mounting tab 507 extending rearwardly from the front insert 511, with a margin on to allow for controlled and limited lateral movement of the mounting tab, and thus, the insert 511. Likewise, rear recess 504 is dimensioned to receive mounting tab 509 extending forward from rear mounting plate 513 with a similar margin. Mounting tabs 507, 509 include threaded transverse bores 518, 516 that are disposed to be co-axial with front 508, 510 and rear bores 512, 514 when mounting tabs 507, 509 are inserted in the front and rear recesses 506, 508. Front and rear inserts 511, 513 are mounted to front and rear ends 501, 503 by inserted mounting tabs 507, and 509 into front and rear recesses 506, 508, so that all bores are aligned. Front and rear threaded rods 521, 523 are inserted through bores to secure inserts 511, 513 to front and rear ends 501, 503.

FIG. 7 illustrates a plan end-on view of the rearward end 503 of a mounting bracket assembly 500. Also shown is the bracket assembly 500 mounted on a slide rail 205. Channel 502 and recess 504 are shown in dashed outline. Rear insert 513 is mounted to bracket body 515 with threaded rod 523 threadably engaged with threaded transverse bore 518. Rotation 702 of the threaded rod 523 causes lateral movement 704 of the tab 509 and thus the insert 513. Lateral movement of the insert 513 is limited by the width of the recess 504. However, the use of the insert allows lateral adjustment of the slide assembly (discussed below) to accommodate varying truck frame widths.

Bracket body 515 also defines front and rear transverse channels 902, 904, best viewed in FIG. 9. Transverse channels 902, 904 are generally perpendicular to longitudinal channel 502, and are spaced apart from each other to correspond to the spacing of the gaps 212 in slide rail 205, so that, when bracket assembly 500 is mounted to slide rail 205, transverse channels 902, 904 can both align with two gaps 212 at the same time. Front and rear tie bar flanges 531, 533 extend from the inward base of the bracket body 515. Each flange 531, 533 includes one or more apertures 802 defined therein.

Bracket assembly 500 is employed in pairs comprised of a left and right bracket assemblies tied together with tie bars and slidably mounted to a pair of left and right slide rails 205. In such a configuration the tied bracket pairs comprise a slide assembly that replaces the pedestal of prior art fifth wheel designs. FIG. 10 depicts the underside of slide assembly 1001, where left and right bracket assemblies 500*a, b* (respectively) are tied together in parallel with front and rear tie bars 1003, 1005. Tie bars 1003, 1005 include apertures at either end 1002 that align with apertures 802 defined through the tie bar flanges 531, 533. A lower support plate 1007 having ends disposed toward the front and the rear with apertures 1012 located at the ends. These apertures 1012 align with tie bar apertures 1002, and with tie bar flange apertures 802 where fasteners may be inserted therein to attach the separate elements together.

Figure 11A:
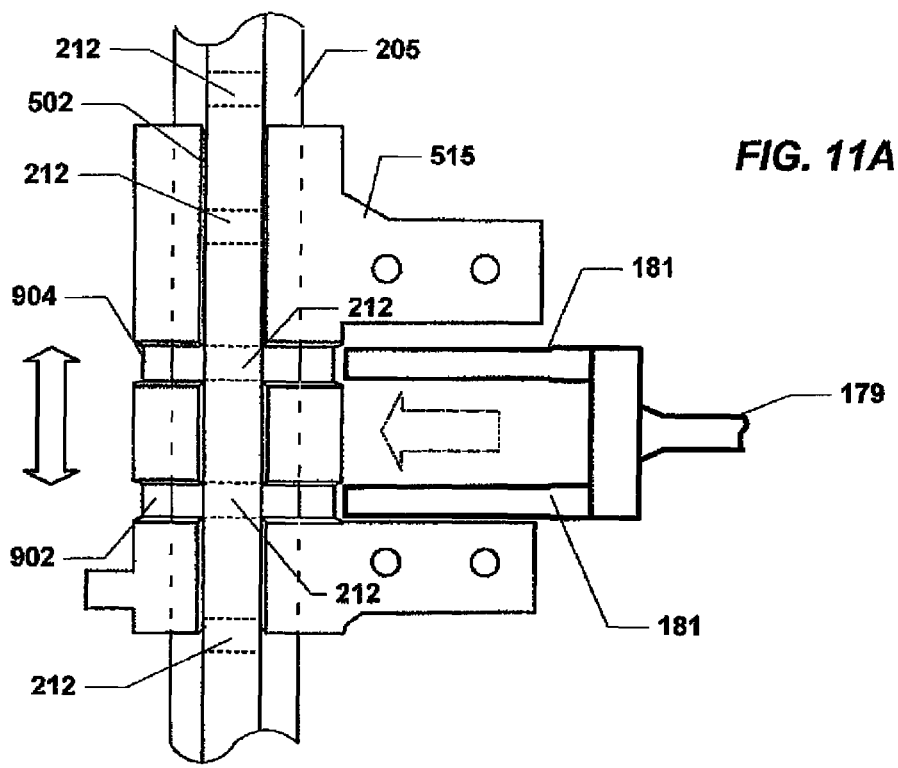
FIGS. 11A & B illustrate engagement of the exemplary bracket assembly with a slide rail and the action to adjust and select longitudinal position of the slide assembly.
Figure 11B:
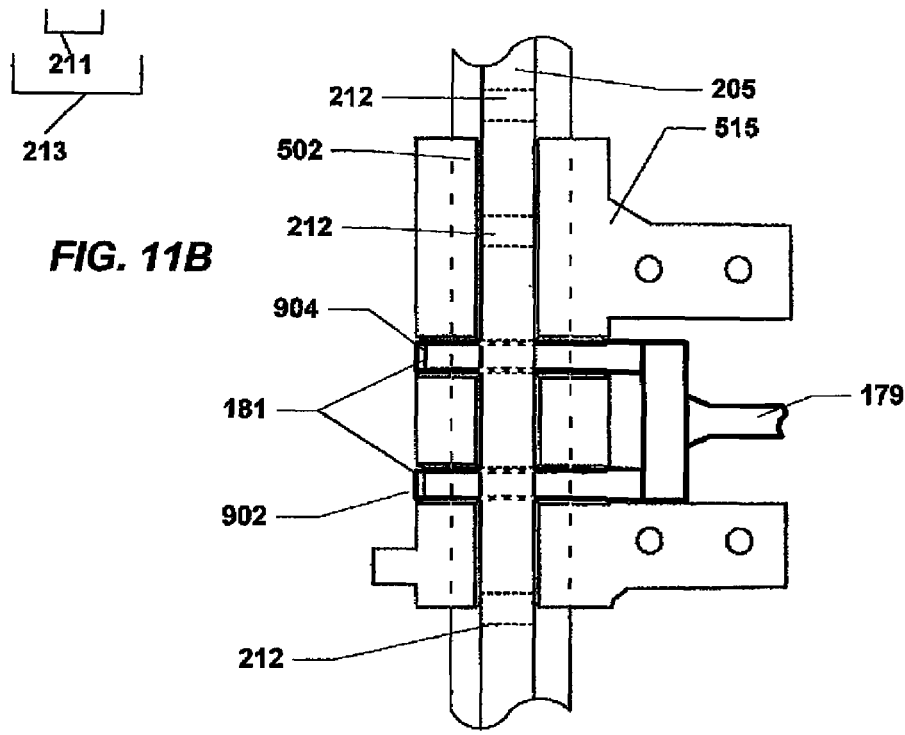

With reference to FIGS. 11A & B the application of the bracket assembly will be discussed. It will be understood that although FIGS. 11A & B show only one bracket side, in this case the left side, the discussion applies equally to the opposing side when the bracket assemblies are tied together as described above, to comprise a slide assembly slidably mounted to parallel slide rails. Both figures are an underside plan view of a left bracket body 515 slidably mounted to a t-shaped left slide rail 205 from FIGS. 2-4. The slide rail 205, again, comprises a vertical section 211, and the horizontal crossing section 213. A plurality of spaced gaps 212 are shown in dashed outline. T-shaped slide rail 205 is inserted within t-shaped channel 502 of the bracket body 515.

To select a longitudinal position for a fifth wheel assembly, the slide assembly is positioned along the parallel slide rails. When the desired longitudinal position is found, a fork member 179 laterally actuated by a plunger (not shown) with two prongs 181 is extended. Transverse channels 902, 904, are aligned with gaps 212 and accommodate the insertion of prongs 181. Gaps 212, and transverse channels 902, 904 are dimensioned to snugly receive prongs 181 therein, and preferably include parallel walls in the horizontal plane that are perpendicular to the longitudinal axis. This design feature affords more support to the prongs 181, and thus, the slide assembly 1001 in the longitudinal direction.

It will be noted that the above described bracket assembly provides significant advantages over the prior art. The bracket body 515 envelopes the t-shaped slide rail 205. Also, the bracket body 515 is engaged with the slide rail 205 through interaction of the prongs 181 with the transverse channels 902, 904 and the spaced-apart gaps 212 defined in the slide rail. The overall result is greater distribution of loading through the slide rail and the slide rail assembly. This permits the overall structure to be comprised of less componentry which means less weight.

Figure 12A:
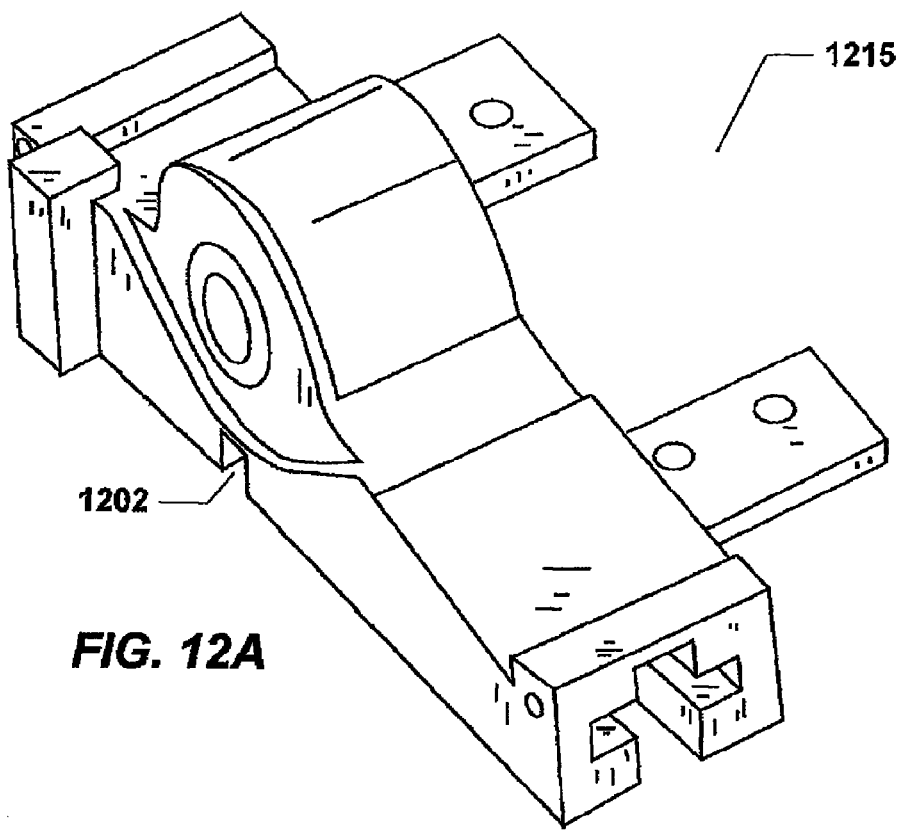
FIGS. 12A & B present an alternative version of the bracket with a single transverse channel.
Figure 12B:
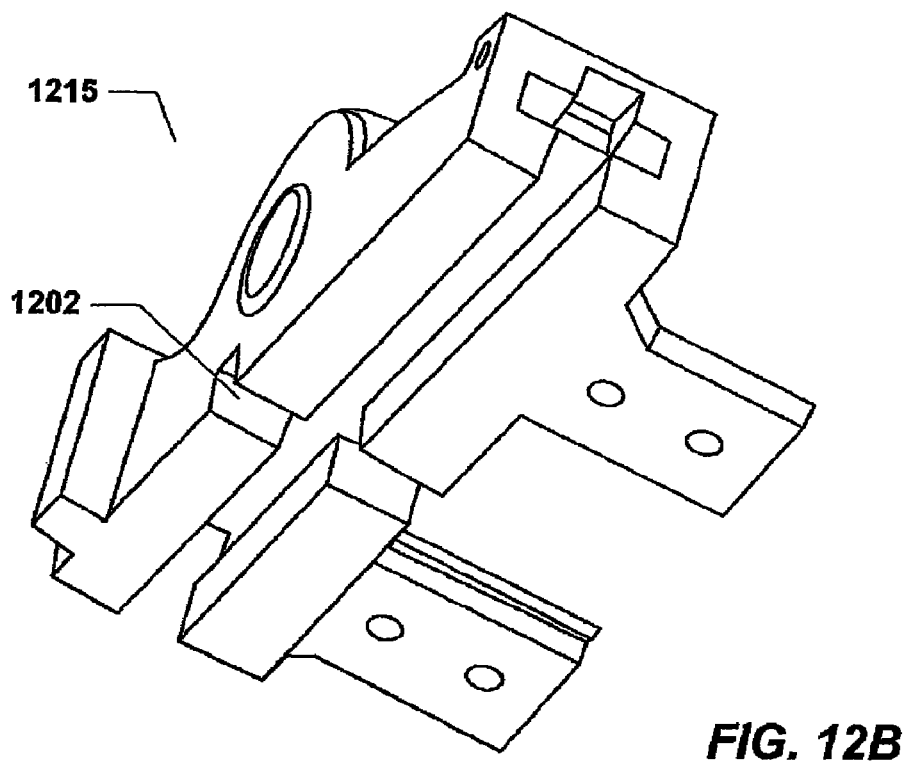
FIGS. 12C & D illustrate engagement of the exemplary bracket assembly of FIGS. 12A and B with a slide rail and the action to adjust and select longitudinal position of the slide assembly.
Figures 12C, 12D:
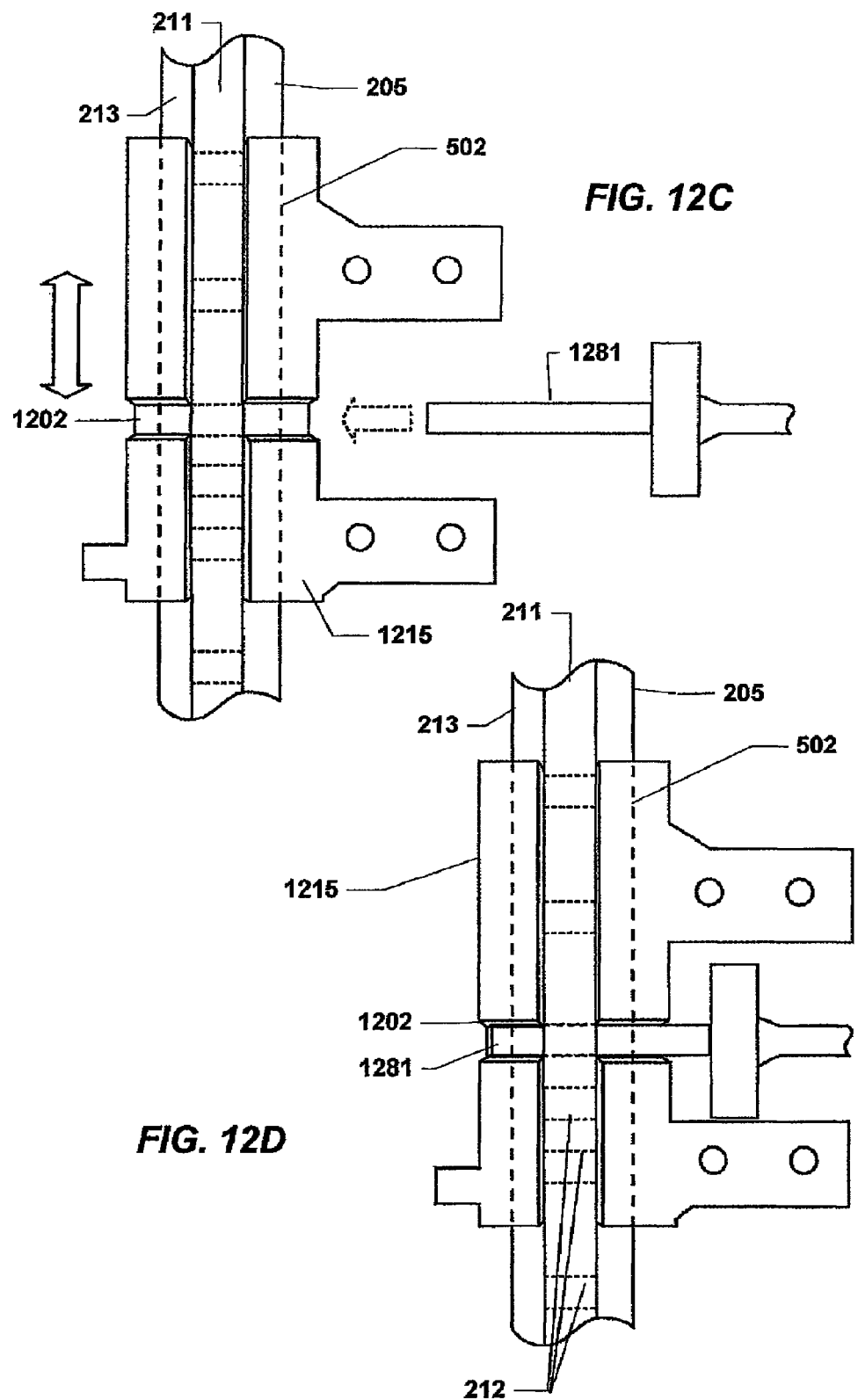

Reference is now made to FIGS. 12A through 12D which illustrate an alternative bracket body version 1215, including the same features as those described above, with the exception that this version 1215 is formed with a single transverse channel 1202. FIGS. 12C and 12D depict the bracket body 1215 from FIG. 12A slidably mounted upon a t-shaped slide rail 205.

It will be understood again that FIGS. 12C & D show only one bracket side, in this case the left side, and that the discussion applies equally to the opposing side when the bracket assemblies are tied together as described above, to comprise a slide assembly slidably mounted to parallel slide rails. Both figures are an underside plan view of a left bracket body 1215 slidably mounted to a t-shaped left slide rail 205 from FIGS. 2-4. The slide rail 205, again, comprises a vertical section 211, and the horizontal crossing section 213. A plurality of spaced gaps 212 are shown in dashed outline. T-shaped slide rail 205 is inserted within t-shaped channel 502 of the bracket body 1215.

As with the previously described embodiment, selection of longitudinal position is achieved by positioning the slide assembly along the parallel slide rails. When the desired longitudinal position is found, a single locking wedge 1281 laterally actuated by a plunger (not shown). Transverse channel 1202 is aligned with a single gap 212 and accommodates the insertion of the wedge 1281. Gaps 212, and transverse channel 1202 are dimensioned to snugly receive wedge 1281 therein, and preferably include parallel walls in the horizontal plane that are perpendicular to the longitudinal axis. This design feature affords more support to the wedge 1281, and thus, the slide assembly 1001 in the longitudinal direction.

As described above and shown in the associated drawings, the present invention comprises a bracket assembly for a fifth wheel coupling. While particular embodiments of the invention have been described, it will be understood, however, that the invention is not limited thereto, since modifications may be made by those skilled in the art, particularly in light of the foregoing teachings. It is, therefore, contemplated by the following claims to cover any such modifications that incorporate those features or those improvements that embody the spirit and scope of the present invention.

What is claimed is:

1. A bracket assembly for an adjustable fifth wheel hitch, said hitch including a slide rail assembly, the slide assembly mounted to parallel longitudinal truck frame members and having a slide rail with a generally t-shaped cross-section comprised of a horizontal portion and a vertical portion, the vertical portion including a plurality of spaced-apart gaps defined therethrough, said bracket assembly comprising: a bracket body having longitudinally disposed front and rear ends, an underside, a longitudinal channel defined in said underside, said channel extending from front and rear openings defined in the respective surfaces of the front and rear ends and having a generally t-shaped cross-section to slidably receive said slide rail, and one or more transverse channels defined in said underside, perpendicular to said longitudinal channel, said one or more channels aligning transversely with one or more of said space-apart gaps, a rounded upper portion for providing pivoting support to a fifth wheel hitch plate, and forward and rear tie-bar flanges extending from one side of the lower portion of said body.

2. The bracket assembly of claim 1, further comprising front and rear recesses defined in the respective surfaces of said front and back ends and located above the front and rear openings, and front and rear inserts comprised of plate members with t-shaped cut-outs defined therein, and mounting tabs extending toward said body and insertable into said front and rear recesses, said mounting tabs each having a threaded bore defined therethrough oriented transversely to the longitudinal axis of said body, and wherein front and rear transverse bores are defined through the lateral sides of said front and rear ends intersecting said front and rear recesses and aligning with said threaded bore when said mounting tab is inserted into said recess, and wherein said insert is retained on said body with a threaded member inserted through said transverse bores and threadably engaging said threaded bore.

3. The bracket assembly of claim 2, wherein the mounting tabs of the inserts have a width slightly less than the width of the recesses to permit lateral adjustment of the insert.

4. The bracket assembly of claim 1, wherein each of said tie bar flanges includes at least one aperture defined therethrough for receiving a fastener.

5. The bracket assembly of claim 4, further comprising front and rear recesses defined in the respective surfaces of said front and back ends and located above the front and rear openings, and front and rear inserts comprised of plate members with t-shaped cut-outs defined therein, and mounting tabs extending toward said body and insertable into said front and rear recesses, said mounting tabs each having a threaded bore defined therethrough oriented transversely to the longitudinal axis of said body, and wherein front and rear transverse bores are defined through the lateral sides of said front and rear ends intersecting said front and rear recesses and aligning with said threaded bore when said mounting tab is inserted into said recess, and wherein said insert is retained on said body with a threaded member inserted through said transverse bores and threadably engaging said threaded bore.

6. The bracket assembly of claim 5, wherein the mounting tabs of the inserts have a width slightly less than the width of the recesses to permit lateral adjustment of the insert.

7. The bracket assembly of claim 1, wherein said one or more transverse channels is two spaced-apart transverse channels, said two transverse channels aligning transversely with two of said space-apart gaps.

8. The bracket assembly of claim 7, wherein each of said tie bar flanges includes at least one aperture defined therethrough for receiving a fastener.

9. The bracket assembly of claim 8, further comprising front and rear recesses defined in the respective surfaces of said front and back ends and located above the front and rear openings, and front and rear inserts comprised of plate members with t-shaped cut-outs defined therein, and mounting tabs extending toward said body and insertable into said front and rear recesses, said mounting tabs each having a threaded bore defined therethrough oriented transversely to the longitudinal axis of said body, and wherein front and rear transverse bores are defined through the lateral sides of said front and rear ends intersecting said front and rear recesses and aligning with said threaded bore when said mounting tab is inserted into said recess, and wherein said insert is retained on said body with a threaded member inserted through said transverse bores and threadably engaging said threaded bore.

10. The bracket assembly of claim 9, wherein the mounting tabs of the inserts have a width slightly less than the width of the recesses to permit lateral adjustment of the insert.

11. A sliding assembly for an adjustable fifth wheel hitch, said hitch including a slide rail assembly, the slide rail assembly having two parallel slide rails mounted lengthwise to parallel longitudinal truck frame members, each slide rail having a generally t-shaped cross-section comprised of a horizontal portion and a vertical portion, the vertical portion including a plurality of spaced-apart gaps defined therethrough along the length thereof, said assembly comprising:
  a. a first and second bracket assemblies mutually tied in parallel with at least one tie member wherein each said bracket assembly is configured to slidably mount each slide rail, each said first and second bracket assembly comprising a bracket body having longitudinally disposed front and rear ends, an underside, a longitudinal channel defined in said underside, said channel extending from front and rear openings defined in the respective surfaces of the front and rear ends and having a generally t-shaped cross-section to slidably receive said slide rail, and one or more transverse channels defined in said underside, perpendicular to said longitudinal channel, said one or more channels space-apart to align transversely with one or more of said space-apart gaps, a rounded upper portion for providing pivoting support to a fifth wheel hitch plate;
  b. first and second laterally extendable plungers mounted between said bracket assemblies, each said plunger having at least one prong for selectable insertion into said one or more transverse channels when said one or more transverse channels are aligned with one or more said space-apart gaps.

12. The sliding assembly of claim 11, wherein said one or more transverse channels comprise parallel transverse walls, and wherein said at least one prong comprises parallel sides to fit snugly within said transverse channels.

13. The sliding assembly of claim 11, further comprising front and rear recesses defined in the respective surfaces of said front and back ends and located above the front and rear openings, and front and rear inserts comprised of plate members with t-shaped cut-outs defined therein, and mounting tabs extending toward said body and insertable into said front and rear recesses, said mounting tabs each having a threaded bore defined therethrough oriented transversely to the longitudinal axis of said body, and wherein front and rear transverse bores are defined through the lateral sides of said front and rear ends intersecting said front and rear recesses and aligning with said threaded bore when said mounting tab is inserted into said recess, and wherein said insert is retained on said body with a threaded member inserted through said transverse bores and threadably engaging said threaded bore.

14. The sliding assembly of claim 13, wherein the mounting tabs of the inserts have a width slightly less than the width of the recesses to permit lateral adjustment of the insert.

15. The sliding assembly of claim 14, wherein said one or more transverse channels comprise parallel transverse walls, and wherein said at least one prong comprises parallel sides to fit snugly within said transverse channels.

16. The sliding assembly of claim 11, wherein said one or more transverse channels is two spaced-apart transverse channels, and wherein said plunger comprises two spaced-apart prongs.

17. The sliding assembly of claim 16, wherein said two spaced-apart transverse channels comprise parallel transverse walls, and wherein said two spaced-apart prongs comprise parallel sides to fit snugly within said transverse channels.

18. The sliding assembly of claim 17, further comprising front and rear recesses defined in the respective surfaces of said front and back ends and located above the front and rear openings, and front and rear inserts comprised of plate members with t-shaped cut-outs defined therein, and mounting tabs extending toward said body and insertable into said front and rear recesses, said mounting tabs each having a threaded bore defined therethrough oriented transversely to the longitudinal axis of said body, and wherein front and rear transverse bores are defined through the lateral sides of said front and rear ends intersecting said front and rear recesses and aligning with said threaded bore when said mounting tab is inserted into said recess, and wherein said insert is retained on said body with a threaded member inserted through said transverse bores and threadably engaging said threaded bore.

19. The sliding assembly of claim 18, wherein the mounting tabs of the inserts have a width slightly less than the width of the recesses to permit lateral adjustment of the insert.

* * * * *